(12) United States Patent
Patton et al.

(10) Patent No.: US 9,119,344 B2
(45) Date of Patent: Sep. 1, 2015

(54) REEL MOWER HAVING QUICK CHANGE GROOMING ATTACHMENTS

(71) Applicants: Robert D. Patton, New Prague, MN (US); Thomas F. Langworthy, Henderson, MN (US)

(72) Inventors: Robert D. Patton, New Prague, MN (US); Thomas F. Langworthy, Henderson, MN (US)

(73) Assignee: The Toro Company, Bloomington, MN (US)

( * ) Notice: Subject to any disclaimer, the term of this patent is extended or adjusted under 35 U.S.C. 154(b) by 204 days.

(21) Appl. No.: 13/759,732

(22) Filed: Feb. 5, 2013

(65) Prior Publication Data

US 2014/0215988 A1   Aug. 7, 2014

(51) Int. Cl.
| | |
|---|---|
| *A01D 34/53* | (2006.01) |
| *A01D 34/62* | (2006.01) |
| *A01D 43/00* | (2006.01) |
| A01B 45/02 | (2006.01) |
| A01G 1/12 | (2006.01) |

(52) U.S. Cl.
CPC ............... *A01D 34/62* (2013.01); *A01D 43/00* (2013.01); *A01B 45/026* (2013.01); *A01G 1/125* (2013.01)

(58) Field of Classification Search
CPC ............... F16D 1/04; Y10T 403/5786; Y10T 403/7021; Y10T 403/69; Y10T 403/7062; Y10T 403/09; Y10T 403/648; A01D 34/52; A01D 34/53; A01D 34/535; A01D 34/001; A01D 43/00; A01B 29/06; A01B 45/00; A01B 29/026; A01G 1/12; A01G 1/125

USPC .......... 403/69, 9, 648, 14, 24, 195, 289, 309, 403/313, 344, 371, DIG. 7, DIG. 9, 341; 56/249, 256, 229, 294, 13.5; 172/52, 172/21

See application file for complete search history.

(56) References Cited

U.S. PATENT DOCUMENTS

| | | | | | |
|---|---|---|---|---|---|
| 3,606,407 | A | * | 9/1971 | Pendergast | ...................... 403/24 |
| 4,175,405 | A | * | 11/1979 | Smith et al. | ...................... 464/81 |
| 4,416,563 | A | * | 11/1983 | Zemke et al. | ................... 403/14 |
| 4,463,498 | A | * | 8/1984 | Everts | .......................... 30/296.1 |
| 4,494,365 | A | | 1/1985 | Lloyd | |

(Continued)

FOREIGN PATENT DOCUMENTS

| | | |
|---|---|---|
| GB | 273790 | 7/1927 |
| GB | 320957 | 10/1929 |

(Continued)

OTHER PUBLICATIONS

WIPO, International Search Report and Opinion, Jun. 3, 2014.

(Continued)

*Primary Examiner* — Árpád Fábián-Kovács
(74) *Attorney, Agent, or Firm* — James W. Miller (57) ABSTRACT

A reel mower has a drive and mounting system for easily and quickly installing a turf grooming attachment. A pair of bearing supports on opposite sides of the reel mower frame provides laterally spaced stub shafts between which the through shaft of the attachment can be nested. A pair of identical clamps releasably couples the opposite ends of the through shaft of the attachment to the adjacent stub shafts. Installation and removal of the clamps is sufficient to install or remove the attachment without requiring disassembly or lateral movement of the bearing supports or of the stub shafts rotatably journalled therein.

10 Claims, 6 Drawing Sheets

(56) References Cited

U.S. PATENT DOCUMENTS

| | | | | |
|---|---|---|---|---|
| 4,505,040 | A | * | 3/1985 | Everts .................. 30/296.1 |
| 4,685,280 | A | | 8/1987 | Lloyd et al. |
| 4,724,662 | A | | 2/1988 | Giandenoto et al. |
| 5,603,173 | A | * | 2/1997 | Brazell .................. 37/244 |
| 5,941,653 | A | * | 8/1999 | Cipriani .................. 403/344 |
| 6,055,798 | A | * | 5/2000 | Fulmer et al. .................. 56/12.7 |
| 6,688,094 | B2 | * | 2/2004 | Berndt et al. .................. 56/249 |
| 7,337,601 | B1 | | 3/2008 | Coffin |
| 2002/0095922 | A1 | * | 7/2002 | Goman et al. .................. 56/16.7 |
| 2006/0191252 | A1 | | 8/2006 | Slater et al. |
| 2008/0196371 | A1 | | 8/2008 | Bryant et al. |
| 2008/0196373 | A1 | * | 8/2008 | Wilson et al. .................. 56/10.1 |
| 2009/0249761 | A1 | | 10/2009 | Rinholm et al. |

FOREIGN PATENT DOCUMENTS

| | | |
|---|---|---|
| GB | 1270093 | 4/1972 |
| GB | 1427117 | 3/1976 |
| GB | 1540217 | 2/1979 |
| GB | 2137062 | 10/1984 |

OTHER PUBLICATIONS

The Toro Company, Model No. 04110 Grooming Kit Parts Catalog, 1997. (Parts 53, 4, 2, 46, 2, 41).

The Toro Company, Model No. 04482 8 & 11 Blade SPA Cutting Unit, 1996. (Rear roller tube 20 rotating on fixed shaft 12 clamped to brackets 11 by collars 25 and carriage screws 24 and nuts 23).

* cited by examiner

REEL MOWER HAVING QUICK CHANGE GROOMING ATTACHMENTS

TECHNICAL FIELD

This invention relates to reel mowers for cutting grass and to turf grooming attachments that are used on such reel mowers for performing a turf grooming operation in addition to the grass cutting operation being performed by the mower. More particularly, this invention relates to a drive and mounting system for the attachments that permits such attachments to be quickly and easily installed and removed from the reel mower.

BACKGROUND OF THE INVENTION

Reel mowers are well known for precision cutting of grass at relatively low heights of cut. For example, reel mowers are often used for cutting grass on the greens of golf courses where a low height of cut is required. Reel mowers customarily include a cutting reel having a plurality of circumferentially spaced spiral blades with the cutting reel extending transversely on the reel mower for rotation about a substantially horizontal lateral axis of rotation. An elongated bedknife having a sharpened cutting edge cooperates with the blades of the cutting reel to sever the standing blades of grass in a shearing action as such blades are pushed against the cutting edge of the bedknife by the rotation of the cutting reel.

Reel mowers of the type noted above typically have front and rear ground engaging rollers in advance of and behind the cutting reel for supporting the reel mower for rolling over the turf surface that contains the grass that is to be cut. Some reel mowers are walk reel mowers which are operated by an operator who walks on the ground behind the reel mower. The operator guides and manipulates the reel mower by gripping an upwardly and rearwardly extending handle assembly. In the case of a walk reel mower, the rear roller often comprises a large diameter traction drum that is operatively driven by the prime mover of the walk reel mower to self-propel the reel mower over the ground.

A turf grooming attachment is sometimes used on reel mowers, including walk and ride-on greensmowers and ride-on fairway mowers, in the space between the front ground engaging roller and the cutting reel. A fairly common turf grooming attachment comprises a shaft that mounts in a side-by-side fashion a plurality of laterally spaced cutting discs along the length thereof. The cutting discs are notched to form a plurality of spaced knife edges around the circumference thereof. The cutting discs are installed on the shaft in an offset manner relative to each other so that corresponding knife edges on the discs wind around the shaft in spiral or helical rows.

The shaft of the grooming attachment described above is rotatably journalled at each end in bearing supports carried on opposite sides of the reel mower. When installed on the reel mower, one end of the shaft is releasably coupled in some fashion to a rotary drive transmission on the reel mower. The drive transmission transfers powered rotation to the shaft and thus to the cutting discs carried on the shaft. As the shaft and the cutting discs rotate together because of the rotary drive imparted to them by the drive member, the helical rows of knife edges engage the turf surface to cut through and lift up the grass blades and/or the thatch layer of the turf surface and to potentially cut small slits in the turf canopy, which includes the grass blades and crown or stolen, depending on the height at which the grooming attachment is set.

The action of the knife edges helps remove the thatch layer since the thatch layer is cut along with the standing grass by the cutting reel and bedknife that are positioned behind the grooming attachment. The newly cut thatch later is then collected along with the newly cut grass clippings in a grass collection basket attached to the reel mower for later disposal. Removal of the thatch layer helps promote the health of the turf and aids in achieving low heights of cut. U.S. Pat. No. 4,494,365 and U.S. Patent Application Publication 2009/0249761 disclose turf grooming attachments of this type.

While turf grooming attachments of this type are effective for the purposes for which they were designed, it can be difficult and time consuming to install and/or remove them from the reel mower. Various portions of the reel mower which support and drive the attachment have to be at least partially loosened, disassembled or removed to provide enough clearance for the attachment to be installed and/or removed. For example, one or both of the bearing supports for the opposite ends of the shaft of the attachment may need to be removed or slid to the sides to free the shaft of the attachment to allow the attachment to be pulled out from between the bearing supports. In addition, the end of the shaft that is positively driven by the drive transmission often extends into a drive housing on the reel mower that houses the drive transmission. The drive housing sometimes contains a lubricant, such as grease, for the drive transmission. Removal of the end of the shaft of the attachment that extends into the drive housing often requires opening the drive housing which thus exposes the lubricant to the operator for potential spillage onto the operator or into the surrounding environment.

The act of removing or installing a turf grooming attachment from a reel mower is not an uncommon occurrence. Turf grooming attachments are needed in certain grass growing conditions but not others. Moreover, attachments of the type noted above with a plurality of side-by-side cutting discs are subject to wear with the knife edges needing to be sharpened or the cutting discs replaced. Finally, there are different types of turf grooming attachments including those with different styles of cutting discs or attachments in which the cutting discs are replaced with spiral brush flights. Thus, the need to swap one turf grooming attachment for another arises frequently. It would be an advantage in the mower art to be able to remove and/or install turf grooming attachments quickly and easily without having to disassemble or disturb those portions of the reel mower that drive and mount the attachments.

SUMMARY OF THE INVENTION

One aspect of this invention relates to a reel mower. The reel mower comprises a frame carrying a prime mover with the frame being supported for rolling over a turf surface having grass. A reel cutting unit is carried on the frame comprising a cutting reel rotatable about a horizontal axis for pushing blades of grass against a cooperating bedknife to sever the blades of grass in a shearing action between the cutting reel and the bedknife. The cutting reel is operatively connected to the prime mover for powered rotation. A turf grooming attachment comprises a rotatable through shaft having opposite ends with the through shaft carrying for rotation therewith an implement assembly that performs a turf grooming operation on the turf surface that is different from the grass cutting performed by the reel cutting unit. The through shaft has a predetermined length between the opposite ends thereof. A drive and mounting system is provided for permitting the turf grooming attachment to be easily installed and removed from the frame. The drive and mounting system comprises a pair of stub shafts with one stub shaft being carried on a left side of the frame and the other stub shaft being carried on a right side of the frame such that the stub shafts are laterally spaced apart from one another by a predetermined distance. The stub shafts are aligned with one another for rotation about a common axis. One of the stub shafts is operatively connected to the prime mover for powered rotation. The predetermined length of the through shaft of the turf grooming attachment is less than the predetermined distance between the stub shafts to allow the turf grooming attachment to be nested between the stub shafts with the opposite ends of the through shaft of the turf grooming attachment being adjacent but spaced laterally inwardly from the stub shafts. The through shaft of the turf grooming attachment when nested between the stub shafts is aligned with the common axis of rotation of the stub shafts. Finally, the system also comprises a pair of clamps for releasably coupling the stub shafts to the adjacent opposite ends of the through shaft of the turf grooming attachment to thereby drive and mount the turf grooming attachment on the frame. The turf grooming attachment can be installed or removed from the frame after the turf grooming attachment is nested between the stub shafts by installing or removing the clamps without disassembling the stub shafts from the frame and without moving the stub shafts laterally relative to the frame.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
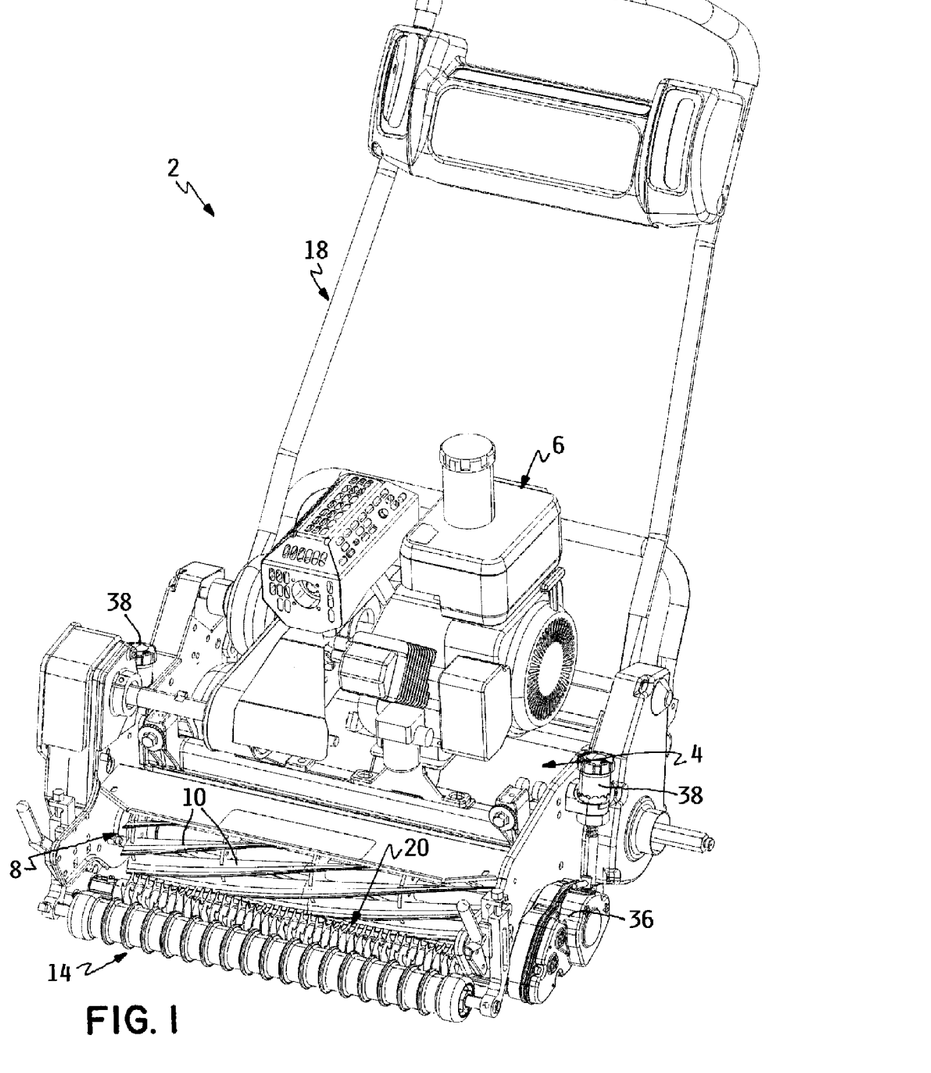
FIG. 1 is a perspective view of a reel mower according to this invention.
Figure 2:
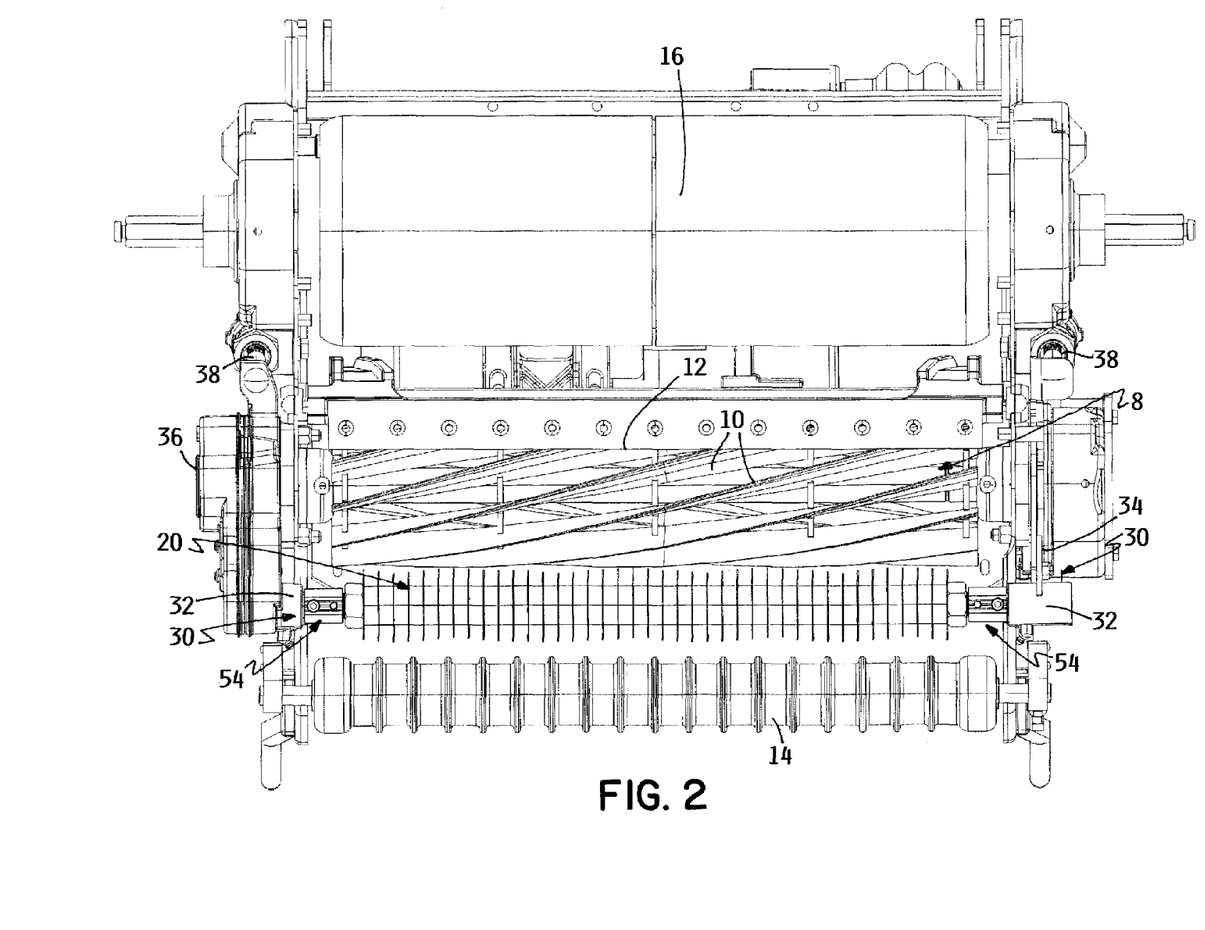
FIG. 2 is a bottom plan view of a portion of the reel mower of FIG. 1.

Referring first to FIGS. 1 and 2, a reel mower according to one embodiment of this invention is generally indicated as 2.

Reel mower 2 has a frame, generally indicated as 4, that carries a prime mover 6, such as an internal combustion engine or electric motor. A cutting reel 8 having a plurality of circumferentially spaced, helical blades 10 is rotatably journalled on frame 4 for rotation about a substantially horizontal axis. Cutting reel 8 cooperates with a bedknife 12 (see FIG. 2) to sever standing blades of grass between bedknife 12 and blades 10 of cutting reel 8 in a shearing action. Cutting reel 8 and bedknife 12 extend laterally across frame 4 of reel mower 2 between the left and right sides of frame 4.

Frame 4 carries a plurality of rotatable ground engaging members for allowing reel mower 2 to roll over a turf surface as it cuts the grass. In the example of reel mower 2 shown in FIGS. 1 and 2, the ground engaging members comprise a relatively small diameter, ribbed front roller 14 known in the art as a Wiehle roller and a relatively large diameter traction drum 16 positioned respectively ahead of and behind cutting reel 8 and bedknife 12. Traction drum 16 is powered by prime mover 6 to self-propel reel mower 2 over the turf surface. Again, in the example of reel mower 2 shown in FIGS. 1 and 2, a handle assembly 18 extends upwardly and rearwardly from frame 4 to allow an operator who walks on the ground behind reel mower 2 to grip handle assembly 18 to guide and manipulate reel mower 2 during a mowing operation. Reel mower 2 as disclosed herein is of the general type of reel mower known as a walk greensmower manufactured and sold by The Toro Company, the Applicant herein, under the brand name Greensmaster®.

Figure 3:
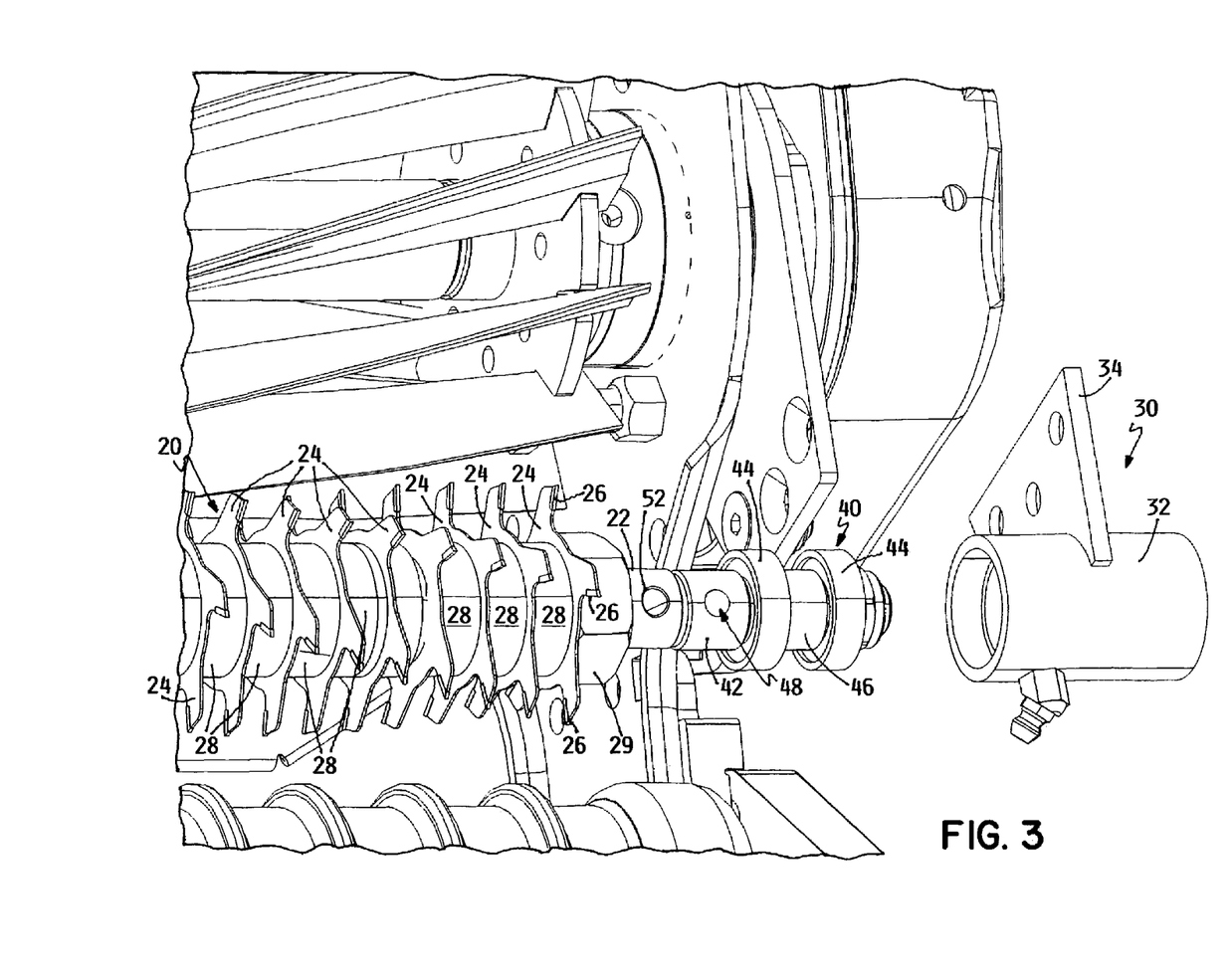
FIG. 3 is an enlarged perspective view of a portion of the reel mower of FIG. 1, particularly illustrating one of the bearing supports carried on the frame of the reel mower for supporting one end of a turf grooming attachment, the bearing support being shown in a partially exploded form with the bearing housing having been exploded to the side to illustrate the bearing assembly that rotatably journals the stub shaft.
Figure 5:
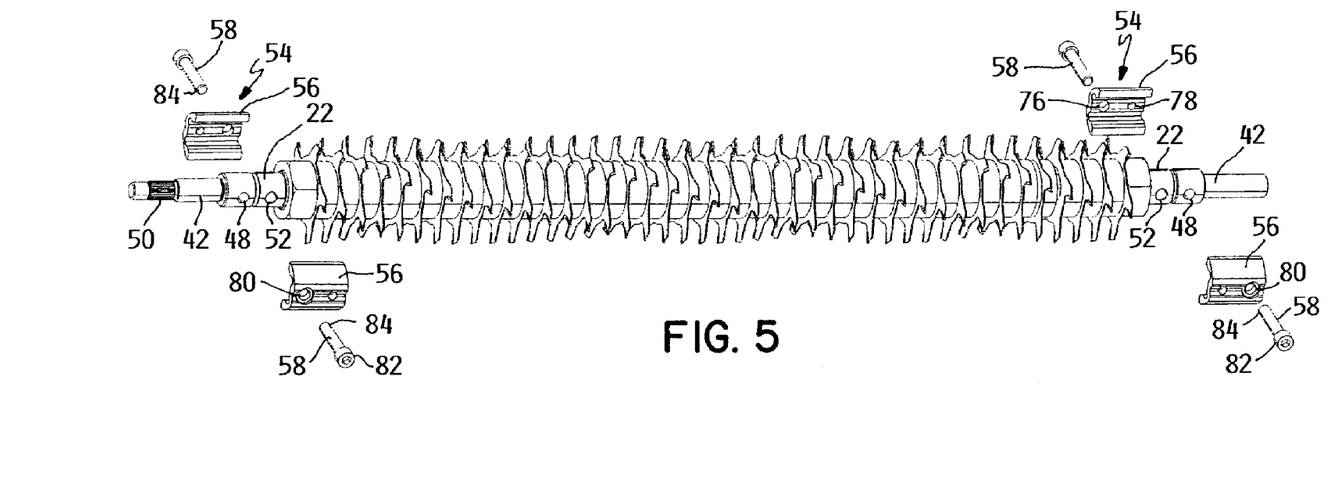
FIG. 5 is a perspective view similar to FIG. 4 particularly showing the shaft of the attachment uncoupled from the stub shafts of the bearing supports.

A turf grooming attachment, generally indicated as 20, is supported and carried by frame 4 of reel mower 2 between front roller 14 and cutting reel 8. As best shown in FIGS. 3 and 5, attachment 20 includes an elongated through shaft 22 which carries a turf grooming implement assembly of some type, i.e. a plurality of annular cutting discs 24 in the case of attachment 20. Discs 24 have a notched periphery which creates a series of circumferentially spaced carbide tipped cutting edges 26 on each disc 24. Discs 24 are progressively rotationally offset relative to one another as they extend in a side-by-side manner along the length of shaft 22 with adjacent discs 24 being laterally separated from one another by spacers 28 received around shaft 22 between adjacent discs 24. The reason for the rotational offset in discs 24 is to allow corresponding cutting edges 26 on discs 24 to collectively form spiral or helical rows of cutting edges 26 along the length of shaft 22. Discs 24 are secured to shaft 22 to rotate with shaft 22 as shaft 22 is itself rotated and are retained in place on shaft 22 by retaining nuts 29. U.S. Pat. No. 4,494,365 is hereby incorporated by reference for teaching how to manufacture one version of this type of attachment 20.

Attachments 20 of the type described above are themselves well known in the mower art as is their placement between the front roller and the cutting reel of a reel mower. This invention relates particularly to a drive and mounting system that permits attachment 20 to be quickly and easily removed from or installed on reel mower 2 while being positively driven when installed. This drive and mounting system will now be explained in detail.

The drive and mounting system of this invention comprises a pair of bearing supports 30 carried on the opposite left and right sides of frame 4 of reel mower 2. As shown in FIG. 2, each bearing support 30 comprises a bearing housing 32. Bearing housing 32 on one side of frame 4 of reel mower 2 is carried on a mounting plate 34. Bearing housing 32 on the opposite side of frame 4 of reel mower 2 is part of a drive housing 36 that encloses a rotary drive of some type, such as a belt drive or a gear drive. The rotary drive within drive housing 36 transmits rotation from the shaft of cutting reel 8 to shaft 22 of attachment 20 for the purpose of positively powering or rotating attachment 20.

Both bearing supports 30 are adjustable towards and away from the ground to adjust the height of attachment 20 relative to the ground to thereby control how aggressively discs 24 act on the turf. This height adjustment is accomplished using known height adjusters 38 that serve to move mounting plate 34 and drive housing 36 that carry bearing housings 32 towards and away from the ground. Height adjusters 38 may be of the type disclosed in U.S. Pat. Nos. 4,878,340 and 7,775,025, which are owned by the Applicant and which are hereby incorporated by reference.

FIG. 3 illustrates bearing support 30 on one side of frame 4 of reel mower 2 in a partially exploded form. As can be seen in FIG. 3, bearing support 30 also includes a bearing assembly 40 which is normally contained and held within bearing housing 32 and a stub shaft 42 that is rotatably supported within bearing assembly 40. Bearing assembly 40 comprises two bearing race assemblies 44 separated by a spacer 46. Each race assembly 44 comprises radially inner and outer races having a plurality of rolling support members therebetween, such as ball bearings or roller bearings, for providing smooth rotation to stub shaft 42. Stub shaft 42 has an exposed, accessible inner end that extends laterally outside of bearing housing 32 when bearing housing 32 is in its usual assembled rather than exploded form. As shown in FIG. 3, the exposed inner end of stub shaft 42 includes a cross-bore 48 with cross-bore 48 extending therethrough along a diameter of stub shaft 42.

Figure 4:
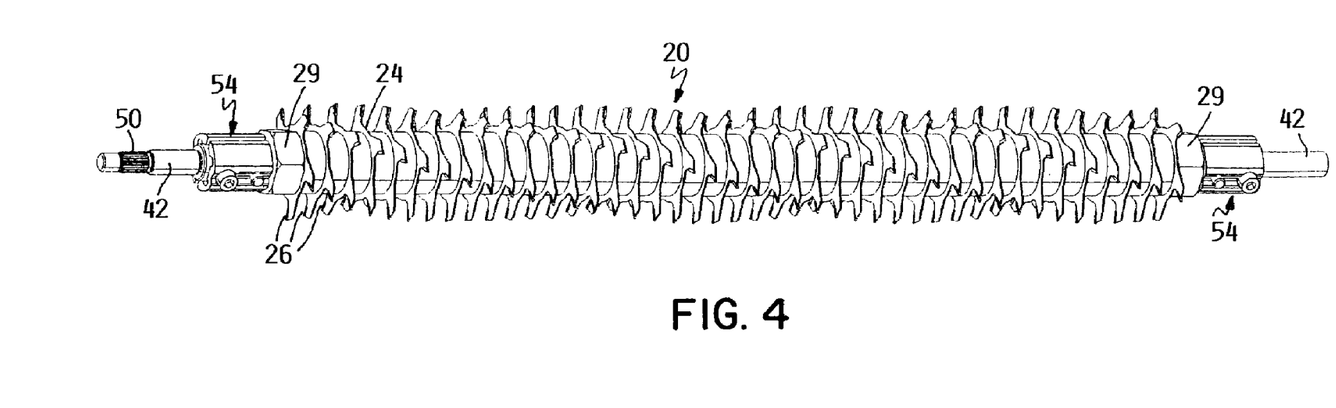
FIG. 4 is a perspective view of the turf grooming attachment of the reel mower of FIG. 1 particularly showing the shaft of the attachment coupled to the stub shafts of the bearing supports.

Bearing support 30 on the other side of frame 4 of reel mower 2 is generally identical to that just described except for the fact that its bearing housing 32 is built as part of drive housing 36 rather than as part of a mounting plate 34. In addition, as more particularly shown in FIGS. 4 and 5, the outer end of stub shaft 42 in bearing support 30 on the other side of frame 4 of reel mower 2 includes a gear 50 suited for operatively engaging a rotary gear drive (not shown) that is contained within drive housing 36. Such gear drive in drive housing 36 is operatively connected in some fashion to prime mover 6, either indirectly through connection to the powered shaft of cutting reel 8 as noted earlier herein or alternatively in a direct manner, such that grooming attachment 20 is ultimately being powered by the power provided by prime mover 6. Thus, as shown in FIG. 4, stub shaft 42 having gear 50 supports one side of attachment 20 while also providing rotary power to attachment 20. Stub shaft 42 without gear 50 on the opposite side of attachment 20 rotatably supports the opposite side of attachment 20 in a passive, unpowered fashion.

As best shown in FIG. 5, stub shafts 42 of bearing supports 30 are aligned on the same horizontal axis with stub shafts 42 being separated from one another by a predetermined lateral space or distance. Attachment shaft 22 has a predetermined length that is slightly less than the predetermined lateral space or distance between stub shafts 42. This allows attachment shaft 22 to be slipped or inserted into the space between stub shafts 42 without having to move or disturb stub shafts 42 or any portion of bearing supports 30 and without having to open drive housing 36 that encloses stub shaft 42 that drives attachment shaft 22. When so inserted between stub shafts 42, each end of attachment shaft 22 will come close to but be slightly spaced laterally inwardly from the adjacent stub shaft. Each end of attachment shaft 22 includes a cross-bore 52 therethrough, identical to cross-bore 48 in each stub shaft 42, extending along a diameter of attachment shaft 22.

The drive and mounting system of this invention additionally includes separable clamps 54 that attach each end of attachment shaft 22 to stub shafts 42 of bearing supports 30. Clamps 54 used on opposite ends of attachment 20 are preferably identical to one another for manufacturing simplicity and ease of use. Clamps 54 are long enough to bridge the small gaps between stub shafts 42 and the ends of attachment shaft 22 and to overlie and extend beyond cross-bores 48 and 52 contained respectively in stub shafts 42 and the ends of attachment shaft 22. See FIGS. 4 and 5.

Each clamp 54 comprises two identical clamp halves 56 that are fastened together by two identical fasteners 58. Each clamp halve 56 has a generally semi-circular or C-shaped cross-section so as to abut and engage against one side of attachment shaft 22 and stub shafts 42. Clamp halves 56 are drawn by fasteners 58 towards one another. When fasteners 58 are fully tightened, clamp halves 56 are drawn tightly into engagement with opposite sides of attachment shaft 22 and stub shafts 42 to durably and tightly clamp attachment shaft 22 to stub shafts 42 in an aligned manner along the horizontal axis defined by stub shafts 42.

Figure 6:
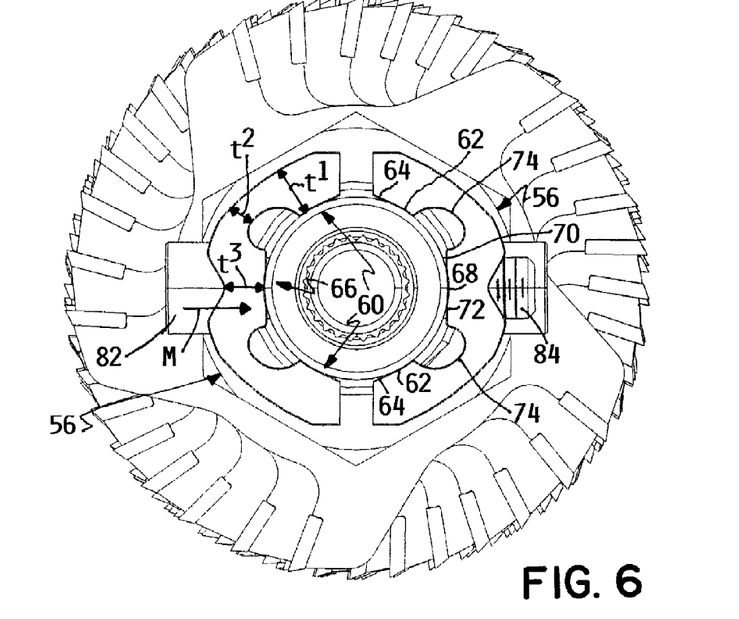
FIG. 6 is an end elevational view of the drive and mounting system of FIG. 4, particularly showing details of the clamps that couple the shaft of the attachment to the stub shafts of the bearing supports.
Figure 7:
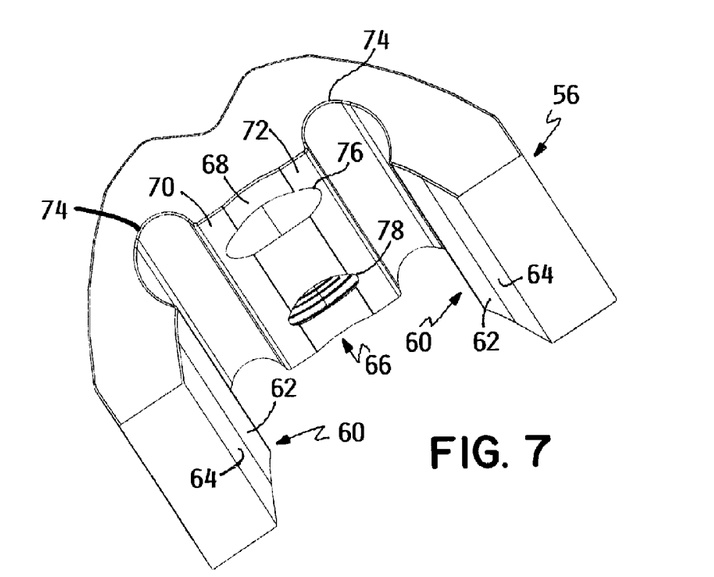
FIG. 7 is a perspective view of one of the clamp halves of the clamp shown in FIG. 6.

Referring now to FIGS. 6 and 7, the ends of the generally C-shaped cross-section of each clamp halve 56, i.e. the top and bottom legs of the C-shape when clamp halve 56 is oriented vertically, each have an identically shaped end abutment surface, indicated generally as 60, that faces radially inwardly and is in two parts. The first part of end abutment surface 60 is an arcuate section 62 that lies on a circle having a diameter substantially equal to the outer diameter of those portions of stub shafts 42 and attachment shaft 22 that carry cross-bores 48 and 52, hereafter referred to as the underlying portions of shafts 22 and 42, that will be covered by clamp halve 56. The second part of end abutment surface 60 is a substantially straight section 64 that extends substantially along a tangent to the circle that contains arcuate section 62. As shown in FIG. 6, when clamp halve 56 is tightly drawn up against the side of the underlying portions of shafts 22 and 42, arcuate section 62 of end abutment surface 60 will be mated with and tightly engage against the outer diameter of the underlying portions of shafts 22 and 42 while straight sections 64 will gradually and slightly move away from such outer diameter to provide appropriate clearance during the installation of clamps 54.

The middle of the generally C-shaped cross-section of each clamp halve 56, i.e. the middle of the C-shape between the top and bottom legs thereof when the C-shape is oriented vertically, contains a middle abutment surface 66 that also faces radially inwardly but has three parts. The first part of middle abutment surface 66 is an arcuate section 68 that substantially matches the curvature of the arc possessed by arcuate section 62 of end abutment surfaces 60. The second and third parts of middle abutment surface 66 are substantially straight sections 70 and 72 that lead and trail arcuate section 68 and that extend substantially along a tangent to the circular arc possessed by arcuate section 68 of middle abutment surface 66. Again, as shown in FIG. 6, when each clamp halve 56 is fully tightened against the underlying portions of shafts 22 and 42, arcuate section 62 of middle abutment surface 66 will tightly mate with and engage against the outer diameters of the underlying portions of shafts 22 and 42 in the same manner as arcuate sections 62 of end abutment surfaces 60. The straight sections 70 and 72 of middle abutment surface 66 will gradually and slightly move away from the outer diameters of the underlying portions of shafts 22 and 42 in the same manner as straight sections 64 of end abutment surfaces 60.

Each clamp halve 56 has recessed portions 74 between end abutment surfaces 60 and opposite sides of middle abutment surface 66. Recessed portions 74 significantly reduce the material thicknesses in the cross-sectional shape of the generally C-shaped clamp halve 56 where recessed portions 74 exist. For example, the radial thickness $t^1$ of clamp halve 56 in end abutment surfaces 60 is approximately 0.250 inches while the radial thickness $t^2$ at the narrowest portion of clamp halve 56 formed by the deepest part of each recessed portion 74 is about half that, i.e. approximately 0.125 inches. The arcuate extent and depth of recessed portions 74 is chosen, in conjunction with the material choices out of which clamp halve 56 is made, permit the middle portion of clamp halve 56 lying between recessed portions 74, i.e. the thickness $t^3$ lying radially outwardly of middle abutment surface 66, to flex radially inwardly as clamp halve 56 is tightened against the outer diameter of the underlying portions of shafts 22 and 42. This flexing action will be described in more detail hereafter.

Each clamp halve 56 has two bores 76 and 78 extending radially through the thickness of the middle portion of the generally C-shaped clamp halve 56. Bores 76 and 78 are spaced side-by-side along the length of clamp halve 56 with a spacing equal to the spacing of cross-bores 48 and 52 in the underlying portions of shafts 22 and 42. Bore 76 is smooth bored while bore 78 is internally threaded. Referring now to FIG. 5 and looking at the radially outer periphery of the middle portion of clamp halve 56, smooth bore 76 has a countersunk recess 80 thereabove to receive the enlarged head 82 of one of fasteners 58. The opposite end of each fastener 58 has a threaded free end 84 which is threaded to mate with the internal threads of threaded bore 78 in clamp halve 56. Thus, fasteners 58 comprise standard machine bolts in which the threads are located along only a free end portion of the shank of the bolt and not along the entire length of the shank of the bolt.

As is apparent from FIGS. 4 and 5, clamp halves 56 of each clamp 54 couple the opposite ends of attachment shaft 22 to the inner ends of the laterally spaced stub shafts 42. In doing so, clamp halves 56 of each clamp are disposed oppositely to one another when they are placed against the opposite sides of the underlying portions of shafts 22 and 42. For example, referring to FIG. 5, clamp halves 56 on the back side of attachment shaft 22 have the smooth bore 76/threaded bore 78 arrangement disposed oppositely to the threaded bore 78/smooth bore 76 arrangement of clamp halves 56 on the front side of attachment shaft 22. This reversal of clamp halves 56 in each clamp 54 ensures that the smooth bore 76 in one clamp halve 56 is aligned with the threaded bore 78 in the other clamp halve 56 of that clamp 54. After clamp halves 56 are so arranged on opposite sides of the underlying portions of shafts 22 and 42, fasteners 58 are then inserted in opposite directions through clamp halves 56 and through cross-bores 48 and 52 in stub shafts 42 and attachment shaft 22. Fasteners 58 are rotated until their threaded free ends 84 begin to thread into threaded bores 78 in clamp halves 56.

When clamp halves 56 of a given clamp 54 are initially installed against the opposite sides of the underlying portions of shafts 22 and 42 and fasteners 58 are first engaged and loosely tightened, arcuate sections 62 of end abutment surfaces 60 of clamp halves 56 will engage against the outer diameters of the underlying portions of shafts 22 and 42. However, it should be noted that arcuate section 68 of middle abutment surface 66 has not yet engaged against the outer diameters of the underlying portions of shafts 22 and 42 at the point when arcuate sections 62 of end abutment surfaces 60 are so engaged initially. As fasteners 58 are progressively tightened, the middle portion of clamp halves 56 begins to move inwardly toward the outer diameter of the underlying portions of shafts 22 and 42 due to the flexing allowed for in clamp halves by recessed portions 74 in clamp halves 56. This inward movement is depicted by the arrow M in FIG. 6.

When fasteners 58 are substantially fully tightened, arcuate sections 68 of middle abutment surface 66 also come into engagement with the outer diameter of the underlying portions of shafts 22 and 42. Thus, shafts 22 and 24 are then tightly held on each side by three points of engagement, namely by arcuate sections 64 of both end abutment surfaces 62 as well as arcuate section 68 of middle abutment surface 66. The flexing action and the progressive nature of how clamp 54 works, engaging first on end abutment surfaces 60 and thereafter in middle abutment surface 66 as well, establishes a durable and tight coupling that allows proper rotary drive transmission to attachment shaft without causing attachment shaft 22 to move out of alignment with stub shafts 42 or to unduly stress either of shafts 22 or 42. This is desirable for a drive and mounting system that must be reliable and not be subject to undue failure.

Reel mower 2 of this invention provides a drive and mounting system for turf grooming attachments 20 that permits easy removal and installation of attachments 20 from reel mower 2. Clamps 54 and fasteners 58 are easily accessible to an operator or mechanic when reel mower 2 is tipped back onto its handle assembly 18 thereby elevating the front of reel mower 2, including attachment 20, above the ground. To install attachment 20 on reel mower 2, it is recommended that one clamp 54 on one side of frame 4 of reel mower 2 be removed substantially in its entirety prior to installation. The other clamp 54 on the opposite side of frame 4 will have the fastener 58 that passes through cross-bore 52 in the adjacent end of attachment shaft 22 removed in its entirety prior to installation, but the remainder of the other clamp 54 including the other fastener 58 will be loosened but left in place on stub shaft 42 of the adjacent bearing support 30. This beginning installation configuration is shown in FIG. 8 hereof.

Figure 8:
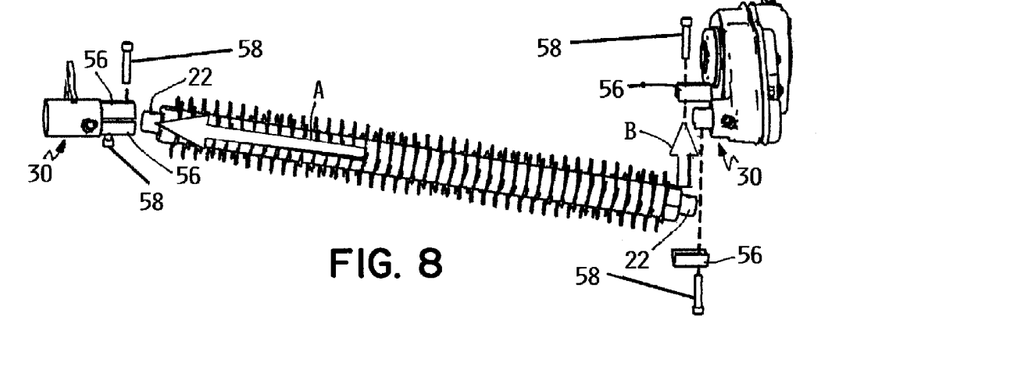
FIG. 8 is diagrammatic view showing the installation of a turf grooming attachment to the reel mower of FIG. 1.

With the clamps 54 configured as shown in FIG. 8, the user or operator can slightly tilt and lift attachment 20 to insert one end of attachment shaft 22 into the partially loosened but still in place clamp 54, as illustrated by arrow A in FIG. 8. Once the one end of attachment shaft 22 is fully slid into the partially loosened clamp 54, the other end of attachment shaft 22 can be lifted up into the space between the other stub shaft 42 and into alignment with the other stub shaft 24 as depicted by the arrow B in FIG. 8. The removed clamp 54 can be then fully fitted around this end of attachment shaft 22 and fastened together by fasteners 58. Then all four fasteners 58 can be installed and tightened as necessary until clamps 54 are fully tightened and attachment shaft 22 is firmly coupled by clamps 54 to both stub shafts 42. Note that simple Allen wrenches are inserted into sockets in the enlarged heads 82 of fasteners 58 to rotate the fasteners 58. The process of removing attachment 20 is basically the reverse of the process shown in FIG. 8 and as described above. Other ways of supporting reel mower 2 and of the process and order in which clamps 54 and fasteners 58 are installed and removed during installation and removal of attachments could also obviously be used. The above description is not meant to be limiting.

One advantage of this invention is the ability to quickly and easily replace attachments 20 without disturbing or having to partially disassemble or even remove either of the bearing supports 30 or any portions thereof including stub shafts 42. All of this structure simply remains as is on frame 4 of reel mower 2 during removal and replacement of attachments 20. This results in a considerable savings of time and labor. This encourages users and operators of reel mowers 2 of this type to swap out one grooming attachment 20 for another whenever this would be desirable from a performance standpoint, i.e. a different type of attachment 20 might be needed at a particular time such as an attachment in which the implement assembly comprises a spiral brush attached by fasteners to through shaft 22 instead of a side-by-side array of cutting discs, or from a maintenance standpoint, i.e. the cutting discs of the currently installed attachment need to be sharpened or replaced.

Figure 9:
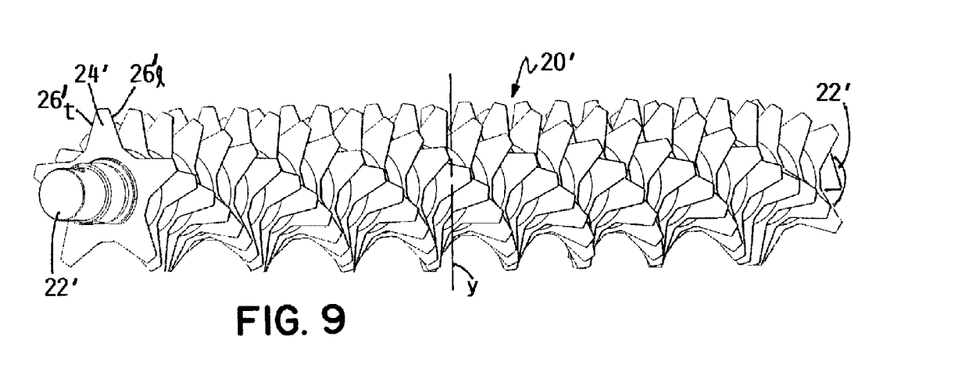
FIG. 9 is perspective view of an alternative turf grooming attachment that may be installed on the reel mower of FIG. 1.
Figure 10:
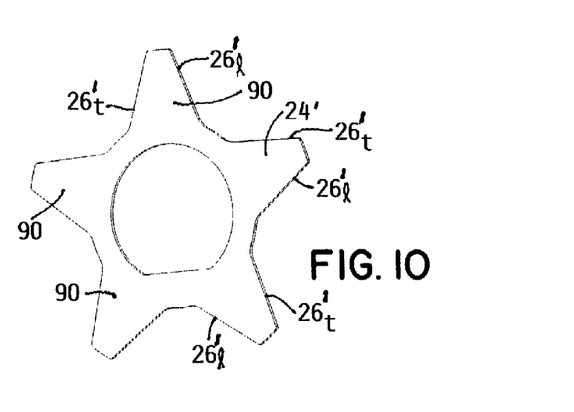
FIG. 10 is perspective view of one of the annular cutting discs of the turf grooming attachment of FIG. 9.

The drive and mounting system of this invention has particular usefulness for the grooming attachment 20' shown in FIGS. 9 and 10. Attachment 20' is identical to attachment 20 except that cutting discs 24' have a different notch pattern around the periphery thereof to form somewhat differently shaped cutting edges 26'. As best shown in FIG. 10, the notch pattern of cutting discs 24' forms a plurality of teeth 90 which are symmetrically shaped relative to a radial line r through the centers of teeth 90. In this case, each tooth 90 is provided with both a leading cutting edge $26'_l$ and trailing cutting edge $26'_t$ taken with respect to the normal direction of rotation of the attachment 20'. Note that attachment 20' is not bi-directionally rotated on reel mower but always rotates in the same direction.

In prior art reel mowers with this type of attachment 20', when the leading cutting edges 26' on attachment 20' became too dull to be effective, one could remove the attachment 20' from the reel mower and then disassemble all of the cutting discs 24' and spacers 28' from attachment shaft 22'. The cutting discs 24' could then be reversed and the cutting discs 24' and spacers 28' restacked on attachment shaft 22' so that the previously unused trailing cutting edges $26'_t$ were now the leading cutting edges $26'_l$. Then, attachment 20' could be put back into service and used until such time as this second set of leading cutting edges $26'_l$ formed by the original trailing cutting edges $26'_t$ became too dull to be effective. At that point, with the cutting edges 26' on both sides of each tooth 90 being dull, attachment 20 would have to be removed from service for sharpening cutting edges 26' or replacing cutting discs 24' with new cutting discs 24'.

All of the part removal, reversal of cutting discs 24', and restacking of cutting discs 24' to reassemble attachment 20' as described above is unnecessary in view of the drive and mounting system of this invention. As shown in FIG. 9, attachment 20' is the same on either end, i.e. attachment shaft 22' is identical insofar as it protrudes out beyond the array of stacked cutting discs 24' and spacers 28'. Either end of attachment 22' can be coupled to either stub shaft 42. Accordingly, now when the leading cutting edges $26'_l$ become too dull to be effective, one need only remove attachment 22' from between stub shafts 42, rotate attachment 20' by 180° around a vertical axis y through the center of attachment 20' to reverse which ends of attachment shaft 22' are coupled to which stub shafts, and then reinstall attachments 22' to stub shafts 22'. Nothing looks or functions differently except that what had been the trailing cutting edges $26'_t$ have now become the leading cutting edges $26'_l$ through simple reversal of attachment 22' in the above-described way. This entirely avoids the laborious reconfiguration of the cutting discs 24' of previously attachments 20' of this type that was required in the prior art and is an obvious advantage of the present invention.

Various modifications of this invention will be apparent to those skilled in the art. Accordingly, the scope of this invention is to be limited only by the appended claims.

The invention claimed is:

1. A reel mower, which comprises:
   (a) a frame carrying a prime mover with the frame being supported for rolling over a turf surface having grass;
   (b) a reel cutting unit carried on the frame comprising a cutting reel rotatable about a horizontal axis for pushing blades of grass against a cooperating bedknife to sever the blades of grass in a shearing action between the cutting reel and the bedknife, wherein the cutting reel is operatively connected to the prime mover for powered rotation;
   (c) a turf grooming attachment comprising a rotatable through shaft having opposite ends with the through shaft carrying for rotation therewith an implement assembly that performs a turf grooming operation on the turf surface that is different from the grass cutting performed by the reel cutting unit;
   (d) a drive and mounting system for permitting the turf grooming attachment to be easily installed and removed from the frame, which comprises:
      (i) a pair of stub shafts with one stub shaft being carried on a left side of the frame and the other stub shaft being carried on a right side of the frame such that the stub shafts are laterally spaced apart from one another by a predetermined distance, the stub shafts being aligned with one another for rotation about a common axis, and one of the stub shafts being operatively connected to the prime mover for powered rotation;
      (ii) wherein the through shaft of the turf grooming attachment has a length and configuration relative to the predetermined distance between the stub shafts and a configuration of the stub shafts that allows the turf grooming attachment to be placed into a nested condition relative to the stub shafts and to be removed from the nested condition without disassembling the stub shafts from the frame and without moving the stub shafts laterally relative to the frame, the through shaft of the turf grooming attachment when in the nested condition being aligned with the common axis of rotation of the stub shafts;
      (iii) a pair of clamps for releasably coupling the stub shafts to the opposite ends of the through shaft of the turf grooming attachment when the turf grooming attachment is in the nested condition to thereby drive and mount the turf grooming attachment on the frame, each clamp in the pair of clamps comprising first and second fasteners for installing each clamp, wherein the first and second fasteners in each clamp are laterally spaced apart relative to one another with the first fastener in each clamp passing through a cross bore in a given one of the stub shafts and the second fastener of each clamp passing through a cross bore in a corresponding end of the through shaft of the turf grooming attachment that is attached to the given one of the stub shafts, the cross bores that receive the fasteners of each clamp being perpendicularly oriented relative to the common axis of rotation of the stub shafts.

2. The mower of claim 1, wherein the length of the through shaft of the turf grooming attachment is less than the predetermined distance between the stub shafts, wherein the opposite ends of the through shaft in the nested condition of the turf grooming attachment are adjacent to but spaced by gaps laterally inwardly of the stub shafts, and wherein the clamps provide the only contact between the through shaft of the turf grooming attachment and the stub shafts with the clamps being sufficiently elongated laterally to span across and cover the gaps between the opposite ends of the through shaft and the stub shafts and to overlie and extend beyond the cross bores in the stub shafts and in the opposite ends of the through shaft.

3. The mower of claim 1, wherein the frame is part of a walk reel mower operated by an operator who walks behind the frame during operation of the walk reel mower and guides and manipulates the frame using an upwardly and rearwardly extending handle assembly on the frame, the frame carrying only one reel cutting unit.

4. The mower of claim 1, wherein each clamp comprises two generally C-shaped clamp halves with each clamp halve having a middle portion that lies between and connects top and bottom legs on either side of the middle portion when the C-shape of the clamp halve is oriented vertically and viewed from one side thereof, the first and second fasteners of each clamp passing radially through the middle portion of the C-shape of each clamp halve when the fasteners are used to secure the clamp halves together around the through and stub shafts.

5. The mower of claim 4, wherein each clamp halve has recessed portions lying between free outer ends of the top and bottom legs of the C-shape and opposite sides of the middle portion of the C-shape, and wherein the recessed portions are sized to permit the middle portion of the C-shape of each clamp halve to flex radially in and out relative to the free outer ends of the legs as the fasteners are tightened to secure the clamp halves.

6. The mower of claim 5, wherein the top and bottom legs of the C-shape of each clamp halve include arcuate, inwardly facing abutment surfaces adjacent the free outer ends thereof and the middle portion of the C-shape of each clamp halve includes an arcuate, inwardly facing abutment surface, wherein all the arcuate abutment surfaces are shaped to mate with and abut against underlying portions of the through and stub shafts when the clamp halves are secured together around the through and stub shafts, and wherein a first one of the recessed portions is circumferentially located between the abutment surface on the top leg and the abutment surface of the middle portion and a second one of the recessed portions is circumferentially located between the abutment surface of the middle portion and the abutment surface on the bottom leg.

7. The mower of claim 6, wherein the arcuate abutment surfaces on the top and bottom legs of the C-shape of each clamp halve are configured to mate with and abut against the underlying portions of the through and stub shafts before the arcuate abutment surface on the middle portion mates with and abuts against the underlying portions of the through and stub shafts, and wherein tightening of the fasteners passing through the middle portion of each clamp halve will draw the abutment surface on the middle portion of each clamp halve radially inwardly towards the underlying portions of the through and stub shafts to mate with and abut against the underlying portions of the through and stub shafts with such radial inward motion of the middle portion of each clamp halve being permitted by the flexing action of the middle portion of each clamp halve relative to the top and bottom legs that is afforded by the recessed portions of each clamp halve.

8. A reel mower, which comprises:
(a) a frame carrying a cutting reel rotatable about a horizontal axis for pushing blades of grass against a cooperating bedknife to sever the blades of grass in a shearing action between the cutting reel and the bedknife;
(b) a turf grooming attachment comprising a rotatable through shaft having opposite ends with the through shaft carrying for rotation therewith an implement assembly that performs a turf grooming operation on the turf surface that is different from the grass cutting performed by the reel cutting unit;
(c) a drive and mounting system for permitting the turf grooming attachment to be easily installed and removed from the frame, which comprises:
(i) a pair of stub shafts with one stub shaft being carried on a left side of the frame and the other stub shaft being carried on a right side of the frame such that the stub shafts are laterally spaced apart from one another, the stub shafts being aligned with one another for rotation about a common axis, and one of the stub shafts being operatively connected to a shaft of the cutting reel for rotating the one stub shaft from rotation of the shaft of the cutting reel;
(ii) wherein the through shaft of the turf grooming attachment is configured to be placed into a nested condition relative to the stub shafts and to be removed from the nested condition without disassembling the stub shafts from the frame and without moving the stub shafts laterally relative to the frame, the through shaft of the turf grooming attachment when in the nested condition being aligned with the common axis of rotation of the stub shafts; and
(iii) a pair of clamps for releasably coupling the stub shafts to the opposite ends of the through shaft of the turf grooming attachment to thereby drive and mount the turf grooming attachment on the frame, each clamp in the pair of clamps comprising first and second fasteners for installing each clamp, wherein the first and second fasteners in each clamp are laterally spaced apart relative to one another with the first fastener in each clamp passing through a cross bore in a given one of the stub shafts and the second fastener of each clamp passing through a cross bore in a corresponding end of the through shaft of the turf grooming attachment that is attached to the given one of the stub shafts, the cross bores that receive the fasteners of each clamp being perpendicularly oriented relative to the common axis of rotation of the stub shafts.

9. A reel mower, which comprises:
(a) a frame carrying a cutting reel rotatable about a horizontal axis for pushing blades of grass against a cooperating bedknife to sever the blades of grass in a shearing action between the cutting reel and the bedknife;
(b) a turf grooming attachment comprising a rotatable through shaft having opposite ends with the through shaft carrying for rotation therewith an implement assembly that performs a turf grooming operation on the turf surface that is different from the grass cutting performed by the reel cutting unit;
(c) a drive and mounting system for permitting the turf grooming attachment to be easily installed and removed from the frame, which comprises:
(i) a pair of stub shafts with one stub shaft being carried on a left side of the frame and the other stub shaft being carried on a right side of the frame such that the stub shafts are laterally spaced apart from one another, the stub shafts being aligned with one another for rotation about a common axis, and one of the stub shafts being operatively connected to a shaft of the cutting reel for rotating the one stub shaft from rotation of the shaft of the cutting reel;
(ii) wherein the through shaft of the turf grooming attachment is configured to be placed into a nested condition relative to the stub shafts and to be removed from the nested condition without disassembling the stub shafts from the frame and without moving the stub shafts laterally relative to the frame, the through shaft of the turf grooming attachment when in the nested condition being aligned with the common axis of rotation of the stub shafts; and (iii) a pair of clamps for releasably coupling the stub shafts to the opposite ends of the through shaft of the turf grooming attachment to thereby drive and mount the turf grooming attachment on the frame, wherein each clamp in the pair of clamps comprises two generally C-shaped clamp halves, and wherein each clamp halve has three inwardly facing abutment surfaces along the C-shape that mate with and abut against underlying portions of the through and stub shafts with the abutment surfaces being circumferentially separated from one another along the C-shape by recessed portions of the clamp halve that lie along the C-shape and that are located in between the abutment surfaces.

10. The mower of claim 9, wherein the recessed portions are large enough to permit inward radial flexing of a middle portion of the C-shape of each clamp halve relative to outer free ends of the C-shape.

\* \* \* \* \*